(12) United States Patent
Chen (10) Patent No.: US 6,988,810 B2
(45) Date of Patent: Jan. 24, 2006

(54) ADJUSTABLE FASTENING ASSEMBLY FOR DOOR MIRROR HAVING AN AUXILIARY MIRROR

(76) Inventor: Ming-En Chen, No. 106, Lane 112, Nanshing Road, Yungkang City, Tainan (TW)

(*) Notice: Subject to any disclaimer, the term of this patent is extended or adjusted under 35 U.S.C. 154(b) by 190 days.

(21) Appl. No.: 10/638,928

(22) Filed: Aug. 11, 2003

(65) Prior Publication Data

US 2004/0218295 A1 Nov. 4, 2004

Related U.S. Application Data (63) Continuation-in-part of application No. 10/426,888, filed on Apr. 30, 2003, now abandoned.

(51) Int. Cl.
*G02B 7/182* (2006.01)

(52) U.S. Cl. ........................................ 359/871
(58) Field of Classification Search ............... 359/871, 359/872; 248/475.1, 476, 479
See application file for complete search history.

(56) References Cited

U.S. PATENT DOCUMENTS 5,724,199 A * 3/1998 Hu .............................. 359/872

* cited by examiner

*Primary Examiner*—Euncha P. Cherry
(74) *Attorney, Agent, or Firm*—Alan D. Kamrath; Nikolai & Mersereau, P.A.

(57) ABSTRACT

A fastening assembly for a door mirror is provided. The door mirror has an auxiliary mirror including, at its rear, a longitudinal block including two slits and a knurled surface, and a scale. The assembly includes a C-shaped frame having hingedly coupled upper and lower bars and upper and lower arms. Each arm includes an interior knurled surface. The upper and the lower arms and the auxiliary mirror are threadedly secured together for engaging the knurled surfaces. The door mirror can be fitted in a space confined by the bars and the arms by adjusting positions of the knurled surfaces of the arms relative to the knurled surface of the block by performing an unfastening and fastening of the arms and the block while observing the scale. The door mirror is fastened in the space by tightening elastic straps over the rear of the door mirror.

17 Claims, 7 Drawing Sheets

ADJUSTABLE FASTENING ASSEMBLY FOR DOOR MIRROR HAVING AN AUXILIARY MIRROR

CROSS REFERENCE

This application is a continuation-in-part of U.S. application Ser. No. 10/426,888, filed Apr. 30, 2003, now abandoned.

BACKGROUND OF THE INVENTION

1. Field of the Invention

The present invention relates to a mechanism for fastening a door mirror of a motor vehicle and more particularly to a frame of a door mirror having a mechanism adapted to adjust the height thereof for fastening the door mirror and its auxiliary mirror.

2. Description of Related Art

Continuing improvements in the exploitation of the adjustment of a door mirror are constantly being sought.

SUMMARY OF THE INVENTION

It is an object of the present invention to provide a fastening assembly for a door mirror of a motor vehicle, the door mirror having an auxiliary mirror. The auxillary mirror includes, at its rear side, a longitudinal block adjacent an inner side thereof. The block includes two slits open to front and rear sides, and a first knurled surface on its rear side. A scale in the form of a plurality of markings is provided on an inner side of the auxiliary mirror adjacent the block. The fastening assembly includes a substantially C-shaped frame having an upper bar including two L-shaped latch members extended downward from an underside thereof, two risers on a top surface thereof, and a first bifurcation at one end. A lower bar includes two L-shaped latch members on a top surface thereof, two elastic straps extended from an underside thereof opposite the latch members, and a second bifurcation at one end. Each elastic strap has a strap fastener at an open end. An upper arm includes an upper connecting end piece hingedly coupled to the first bifurcation, a longitudinal first groove, a lower lateral channel in communication with the first groove, and a second knurled surface at an inner surface of the first groove. A mated lower arm includes a lower connecting end piece hingedly coupled to the first bifurcation, a longitudinal second groove, an upper lateral channel in communication with the second groove, and a third knurled surface at an inner surface of the second groove. The upper and the lower arms and the auxiliary mirror are fastened together by driving upper and lower bolts through the slits and the channels into upper and lower nuts respectively so as to engage the first knurled surface with the first and the third knurled surfaces. The snap fasteners are snapped onto the risers by crossing the elastic straps over a rear surface of the door mirror prior to stretching the elastic straps for fastening the door mirror in a space confined by the upper and the lower bars and the upper and the lower arms. The door mirror is fit in the space by adjusting positions of the second and the third knurled surfaces relative to the first knurled surface by performing an unfastening and fastening of the bolt and nut combinations at least one time while observing the markings of the scale.

The above and other objects, features and advantages of the present invention will become apparent from the following detailed description taken with the accompanying drawings.

DETAILED DESCRIPTION OF THE PREFERRED EMBODIMENTS

Referring to FIGS. 1 to 5, there is shown a door mirror frame constructed in accordance with the invention. The frame has an adjustable fastening assembly 1 for a door mirror 9 having an auxiliary mirror 8 of a motor vehicle. The frame is substantially C-shaped and comprises an upper bar 2 including two L-shaped latch members 21 extended downward from an underside thereof, two risers 26 on a top surface thereof, and a bifurcation 24 at one end. The bifurcation 24 has a transverse aperture 25. The frame further comprises a lower bar 3 including two L-shaped latch members 31 on a top surface thereof, two elastic straps 32 extended from an underside thereof opposite the latch members 31, and a bifurcation 34 at one end. The bifurcation 34 has a transverse aperture 35. Each elastic strap 32 has a snap fastener 33 at its open end. The frame further comprises an upper arm 4 including an upper connecting end piece 41 having an aperture 42, a longitudinal groove 43, a lower lateral channel 45 in communication with the groove 43, and a knurled surface 44 at an inner surface of the groove 43. The frame further comprises a mated lower arm 5 including a lower connecting end piece 51 having an aperture 52, a longitudinal groove 53, an upper lateral channel 55 in communication with the groove 53, and a knurled surface 54 at an inner surface of the groove 53. The frame further comprises an elongate flat member 7 having a central hole 71. Also, the auxiliary mirror 8 at its rear side comprises a warning light 87 adjacent an outer side thereof and a longitudinal block 81 adjacent an inner side thereof. The block 81 includes two slits 83 open to front and rear sides, a knurled surface 82 on its rear side, and a lateral hole 85 between the slits 83 open to front and rear sides. The auxiliary mirror further comprises a slot 84 in a forward side opposite the block 81. The auxiliary mirror 8 at its rear side further comprises a scale 86 in the form of a plurality of markings adjacent he block 81.

Figure 1:
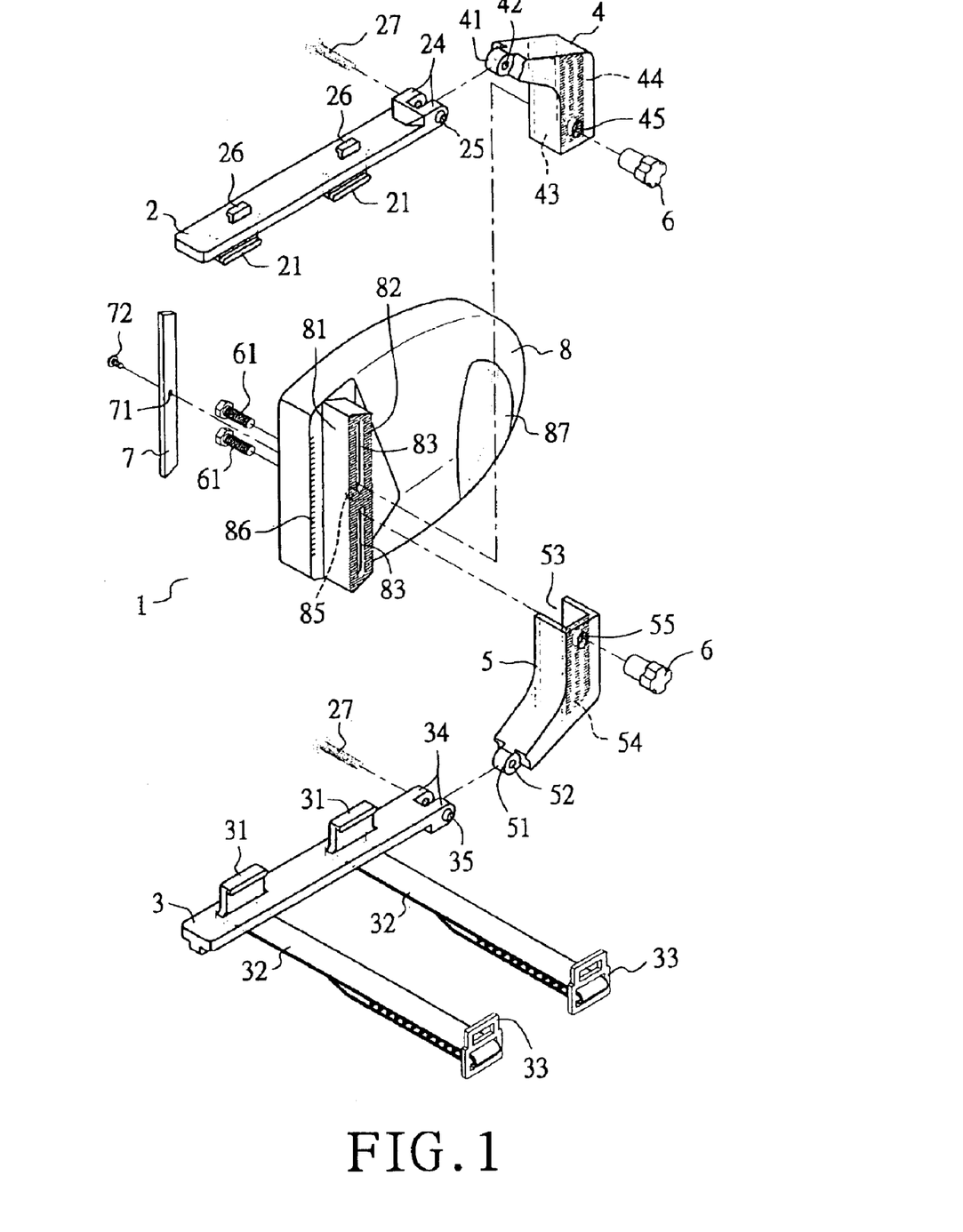
FIG. 1 is an exploded view of a preferred embodiment of the frame having a mechanism for adjustably fastening a door mirror according to the invention.
Figure 2:
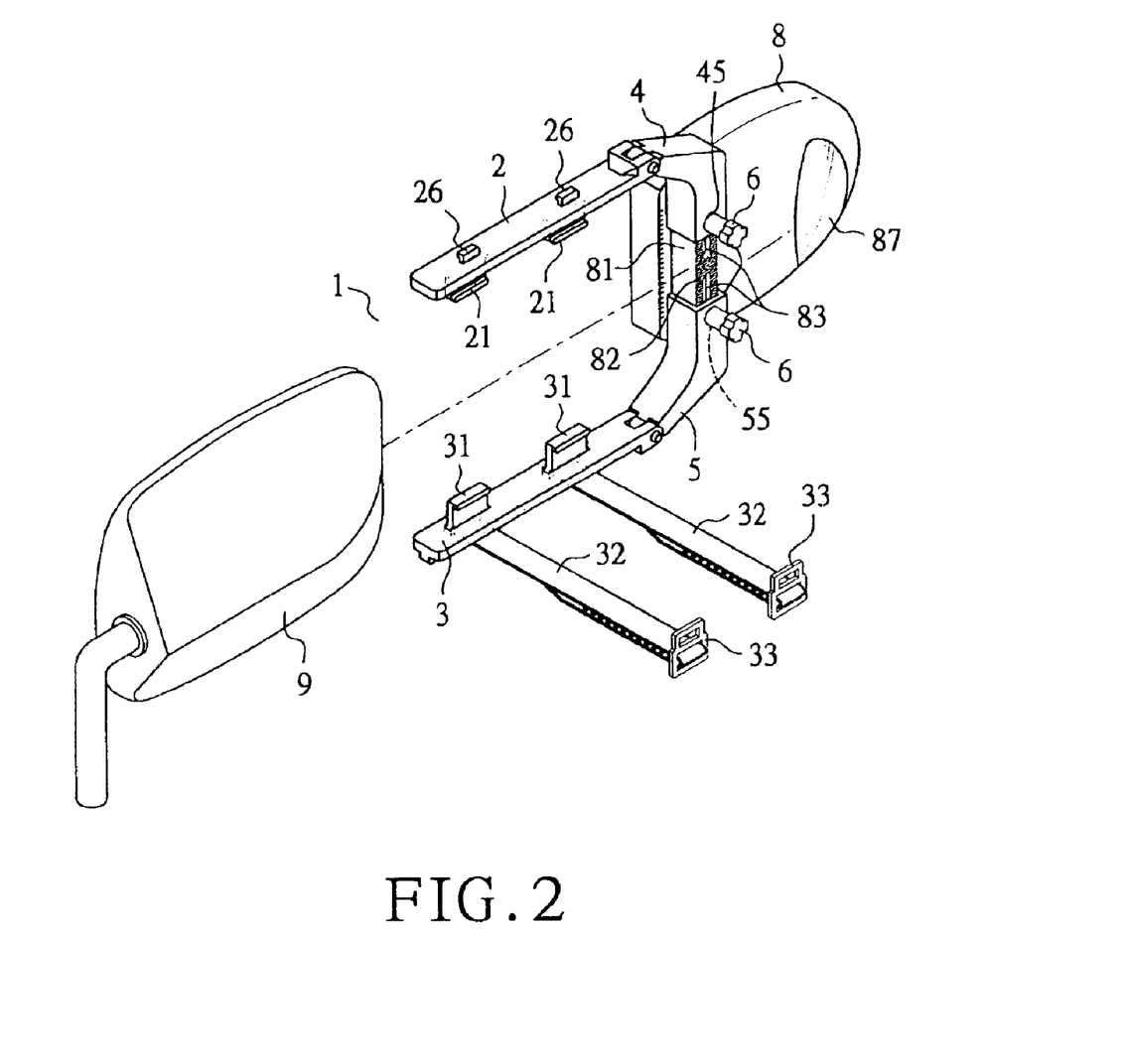
FIG. 2 is an assembled view of FIG. 1 and a door mirror to be assembled.
Figure 3:
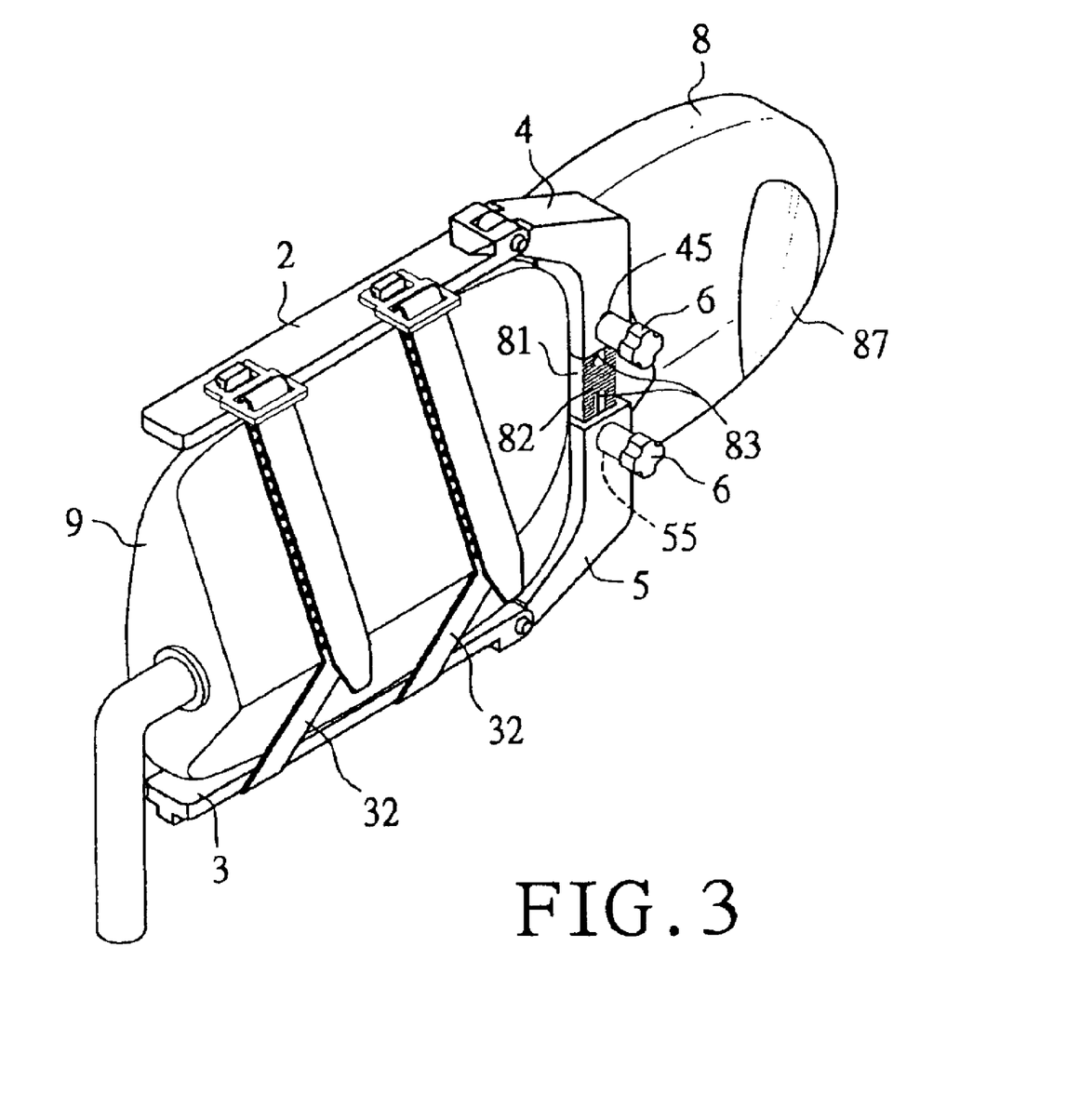
FIG. 3 is an assembled view of FIG. 2.

In assembly, the bifurcation 34 and the lower connecting end piece 51 are connected together by fastening a bolt and nut combination 27 through the apertures 35 and 52. The bifurcation 24 and the upper connecting end piece 41 are connected together by fastening another bolt and nut combination 27 through the apertures 25 and 42. The upper and the lower arms 4 and 5 and the auxiliary mirror 8 are assembled together by driving upper and lower bolts 61 through the slits 83 and the channels 45 and 55 into the threaded portions 62 of upper and lower nuts 6 respectively. Thus the knurled surface 82 is engaged with the knurled surfaces 44 and 54. A screw 72 is driven through the hole 71 into the hole 85 for fastening the flat member 7 in the slot 84. This completes the fastening of the auxiliary mirror 8 and the frame. Next, the door mirror 9 is fit in a space confined by the upper bar 2, the lower bar 3, the upper arm 4, and the lower arm 5. Finally the snap fasteners 33 are snapped onto the risers 26 by crossing the elastic straps 32 over a rear surface of the door mirror 9 prior to stretching the elastic straps 32 for tightening. As a result, the door mirror 9 is secured between the upper and the lower bars 2 and 3.

Figure 4:
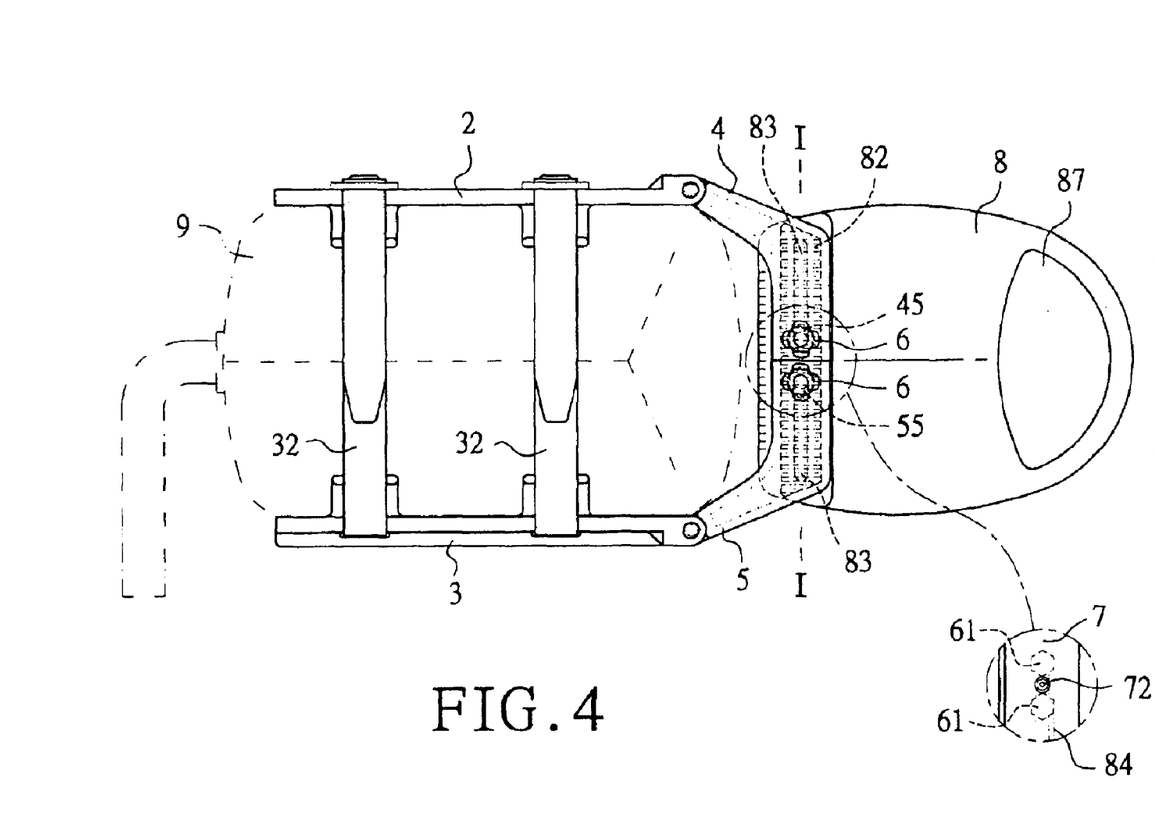
FIG. 4 is a rear plan view of FIG. 3, where a door mirror having a smaller width is shown and a portion confined by a circle is greatly enlarged.
Figure 5:
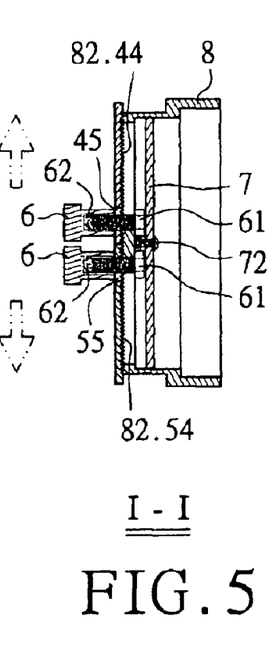
FIG. 5 is a cross-sectional view taken along line I—I of FIG. 4.
Figure 6:
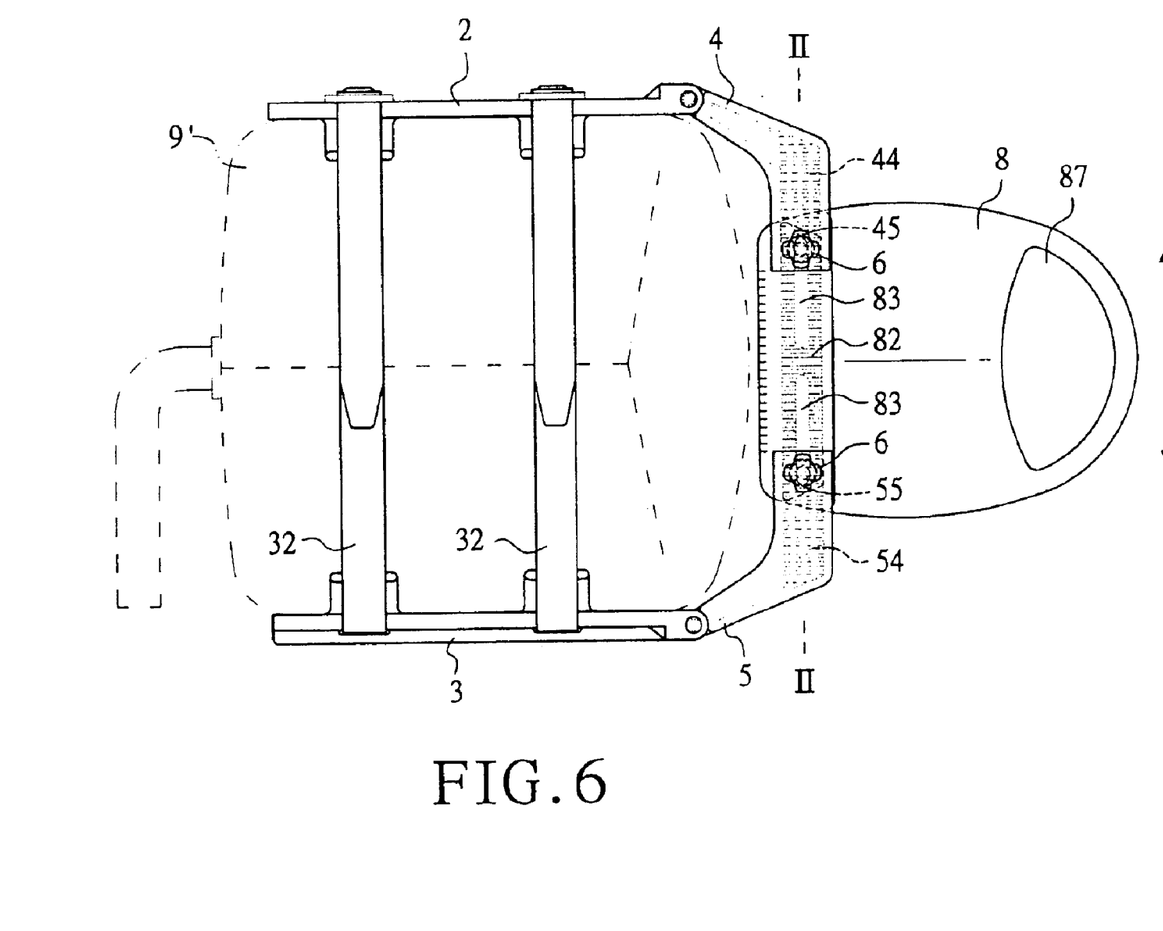
FIG. 6 is a view similar to FIG. 4, where a door mirror having a larger width is shown.
Figure 7:
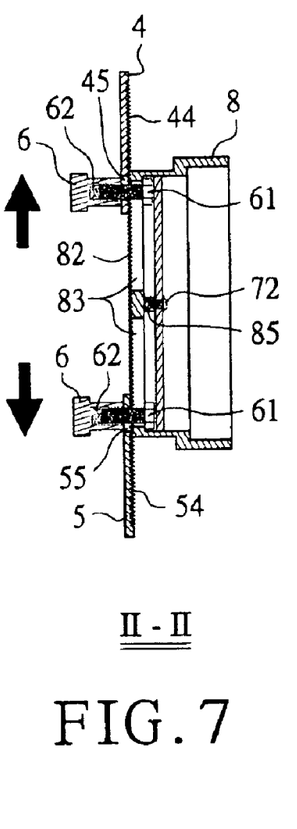
FIG. 7 is a cross-sectional view taken along line II—II of FIG. 6.

Referring to FIGS. 4, 5, 6, and 7, an adjustment operation of the assembly for being adapted to different sized door mirrors 9 will be described. As shown in FIGS. 4 and 5, in a case that the door mirror 9 has a smaller width, a user can first unfasten the nuts 6 until the upper and the lower arms 4 and 5 are free to slide about the block 81. Next, the arms 4 and 5 (i.e., the knurled surfaces 54 and 44) are slid toward each other, with the knurled surfaces 54 and 44 being moved relative to the knurled surface 82. Thus, a distance between the upper and the lower bars 2 and 3 is reduced until the door mirror 9 is snugly fitted between the upper and the lower bars 2 and 3. Finally, the nuts 6 are fastened, and the elastic straps 32 are stretched again for further tightening. As a result, the door mirror 9 is secured. In another case that the door mirror 9 has a wider width, a similar adjustment operation can be performed as shown in FIGS. 6 and 7. A user can first unfasten the nuts 6 until the upper and the lower arms 4 and 5 are free to slide about the block 81. Next, the snap fasteners 33 are disengaged from the risers 26 for loosening the elastic straps 32. Next, the arms 4 and 5 (i.e., the knurled surfaces 54 and 44) are slid away from each other with the knurled surfaces 54 and 44 being moved relative to the knurled surface 82. Thus, a distance between the upper and the lower bars 2 and 3 is increased until the door mirror 9 is snugly fitted between the upper and the lower bars 2 and 3. Finally, the nuts 6 are fastened, and the elastic straps 32 are stretched again for tightening. As a result, the door mirror 9 is secured. Note that the fitness of the door mirror 9 between the upper and the lower bars 2 and 3 can be precisely controlled by observing the markings of the scale 86. In brief, the door mirror 9 can be reliably secured between the upper and the lower bars 2 and 3 by adjusting the above assembly.

Figure 8:
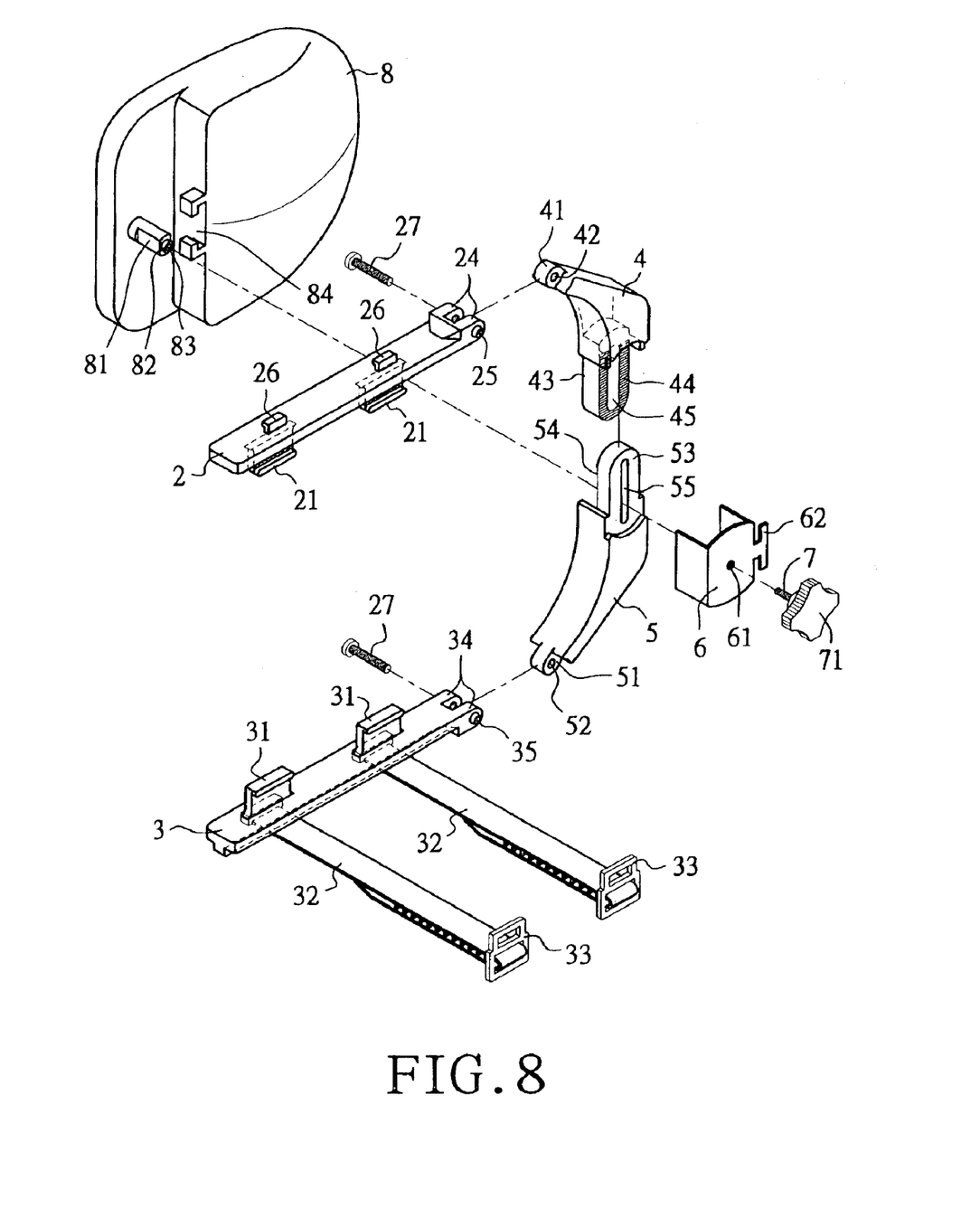
FIG. 8 is an exploded view of the frame of U.S. application Ser. No. 10/426,888.
Figure 9:
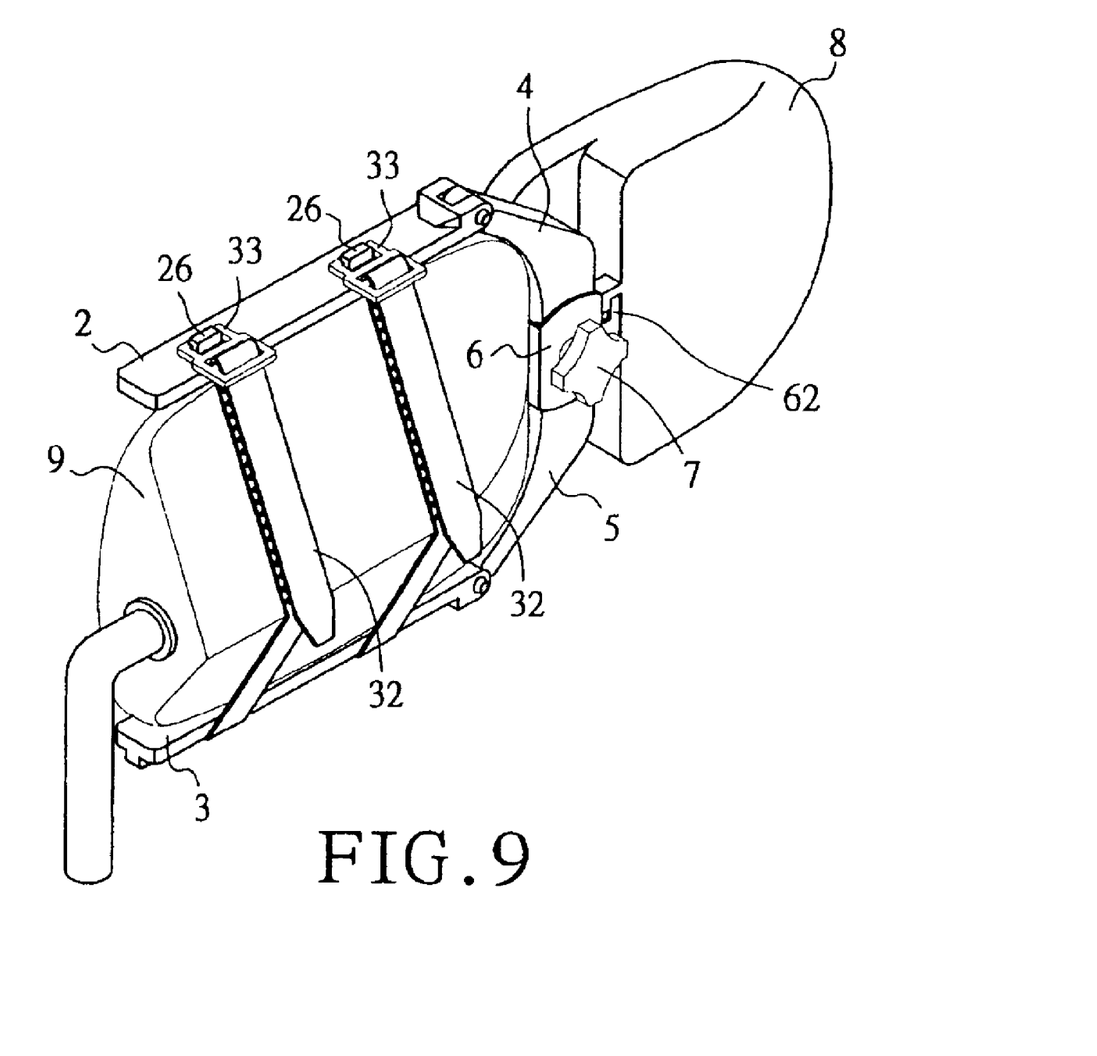
FIG. 9 is an assembled view of frame shown in FIG. 8 and a door mirror.

As shown in FIGS. 8 and 9, U.S. application Ser. No. 10/426,888, filed on Apr. 30, 2003, entitled "Adjustable Fastening Mechanism for Door Mirror Having An Auxiliary Mirror", disclosed an adjustment operation of the mechanism for being adapted to different sized door mirrors 9. In a case that the door mirror 9 is relatively large, a user can first detach a cap 6 and a trigger member 7 having a knob 71 from the frame. Next, the upper arm 4 is pulled a suitable distance from the lower arm 5 by moving the knurled surface 44 relative to the knurled surface 54 or vice versa until the height of the door mirror 9 is about equal to a distance between upper and lower bars 2 and 3. Next, the cap 6 is put onto the knurled surfaces 54 and 44 for covering with a T-shaped projection 62 snapped into a T-shaped cavity 84. The screw portion of the trigger member 7 is driven through an aperture 61 and channels 55 and 45 into a nut 83 for fastening the auxiliary mirror 8 and the frame together. Next, the door mirror 9 is fit in a space confined by the upper bar 2, the lower bar 3, the upper arm 4, and the lower arm 5. Finally, snap fasteners 33 are snapped onto the risers 26 by crossing the elastic straps 32 over the rear surface of the door mirror 9 prior to stretching the elastic straps 32. As a result, the door mirror 9 is secured between the upper and lower bars 2 and 3. In another case that the door mirror 9 is relatively small, a similar adjustment operation can be performed. In brief, the door mirror 9 can be reliably secured between the upper and lower bars 2 and 3 by adjusting the mechanism.

While the invention herein disclosed has been described by means of specific embodiments, numerous modifications and variations could be made thereto by those skilled in the art without departing from the scope and spirit of the invention set forth in the claims.

What is claimed is:

1. Assembly for a door mirror of a motor vehicle, with the assembly comprising, in combination: an upper arm including an upper connecting end piece and a knurled surface; a lower arm including a lower connecting end piece and a knurled surface; and an auxiliary mirror, with the upper arm being adjustably attached to the auxiliary mirror by sliding in a longitudinal direction relative to the auxiliary mirror, with the lower arm being adjustably attached to the auxiliary mirror by sliding in the longitudinal direction relative to the auxiliary mirror, with the upper and lower connecting pieces being spaced in the longitudinal direction at differing spacings by adjustably attaching the upper and lower arms to the auxiliary mirror, with the upper and lower arms being adapted to be attached to the door mirror of the motor vehicle.

2. The assembly of claim 1 further comprising, in combination: a block including a knurled surface extending in the longitudinal direction, with the upper arm including a groove extending in the longitudinal direction and for slideably receiving the block, with the knurled surface of the upper arm located in the groove of the upper arm and engaging the knurled surface of the block, with the lower arm including a groove extending in the longitudinal direction and for slideably receiving the block, with the knurled surface of the lower arm located in the groove of the lower arm and engaging the knurled surface of the block.

3. The assembly of claim 2 with the block including at least one slit extending in the longitudinal direction, with the upper arm including an upper channel, with an upper bolt extending through the slit and the upper channel, with the lower arm including a lower channel, with a lower bolt extending through the slit and the lower channel.

4. The assembly of claim 3 further comprising, in combination: a scale extending in the longitudinal direction on the auxiliary mirror.

5. The assembly of claim 4 further comprising, in combination: an upper bar, with the upper bar being pivotally connected to the upper connecting end piece; and a lower bar, with the lower bar being pivotally connected to the lower connecting end piece, with the upper and lower bars being adapted to be fastened to the door mirror of the vehicle.

6. The assembly of claim 5 further comprising, in combination: at least one elastic strap extending between the upper and lower bars and adapted to extend over the door mirror of the vehicle.

7. The assembly of claim 1 further comprising, in combination: a block including a knurled surface extending in the longitudinal direction, with the knurled surface of the upper arm abutting with the knurled surface of the block, with the knurled surface of the lower arm abutting with the knurled surface of the block.

8. The assembly of claim 7 with the block including at least one slit extending In the longitudinal direction, with the upper arm including an upper channel, with an upper bolt extending through the slit and the upper channel, with the lower arm including a lower channel, with a lower bolt extending through the slit and the lower channel.

9. The assembly of claim 7 further comprising, in combination: a scale extending in the longitudinal direction on the auxiliary mirror.

10. The assembly of claim 9 further comprising, in combination: an upper bar, with the upper bar being pivotally connected to the upper connecting end piece; and a lower bar, with the lower bar being pivotally connected to the lower connecting end piece, with the upper and lower bars being adapted to be fastened to the door mirror of the vehicle.

11. The assembly of claim 10 further comprising, in combination: at least one elastic strap extending between the upper and lower bars and adapted to extend over the door mirror of the vehicle.

12. Assembly for a door mirror of a motor vehicle, with the assembly comprising, in combination: an auxiliary mirror, with the auxiliary minor including a mirrored inner side and an outer side opposite to the mirrored inner side; a warning light on the outer side opposite to the mirrored inner side; and a C-shaped frame adapted to be attached to the door mirror of the motor vehicle, with the auxiliary mirror attached to the C-shaped frame.

13. The assembly of claim 12 with the C-shaped frame including an upper arm adjustably attached to the auxiliary mirror and having an upper connecting end piece; a lower arm adjustably attached to the auxiliary mirror and having a lower connecting end piece; an upper bar, with the upper bar being pivotally connected to the upper connecting end piece; and a lower bar, with the lower bar being pivotally connected to the lower connecting end piece, with the upper and lower bars being adapted to be fastened to the door mirror of the vehicle.

14. The assembly of claim 13 with the upper arm including a knurled surface, with the lower arm including a knurled surface, with the upper arm being adjustably attached to the auxiliary mirror by sliding in a longitudinal direction relative to the auxiliary mirror, with the lower arm being adjustably attached to the auxiliary mirror by sliding in the longitudinal direction relative to the auxiliary mirror, with the upper and lower connecting pieces being spaced in the longitudinal direction at differing spacings by adjustably attaching the upper and lower arms to the auxiliary mirror.

15. The assembly of claim 14 further comprising, in combination: a block including a knurled surface extending in the longitudinal direction, with the upper arm including a groove extending in the longitudinal direction and for slideably receiving the block, with the knurled surface of the upper arm located in the groove of the upper arm and engaging the knurled surface of the block, with the lower arm including a groove extending in the longitudinal direction and for slideably receiving the block, with the knurled surface of the lower arm located in the groove of the lower arm and engaging the knurled surface of the block.

16. The assembly of claim 15 with the block including at least one slit extending in the longitudinal direction, with the upper arm including an upper channel, with an upper bolt extending through the slit and the upper channel, with the lower arm including a lower channel, with a lower bolt extending through the slit and the lower channel.

17. The assembly of claim 14 further comprising, in combination: a block including a knurled surface extending in the longitudinal direction, with the knurled surface of the upper arm abutting with the knurled surface of the block, with the knurled surface of the lower arm abutting with the knurled surface of the block.

\* \* \* \* \*